United States Patent
Falzarano et al.

(10) Patent No.: US 10,999,153 B1
(45) Date of Patent: May 4, 2021

(54) VIRTUAL STACK SETUP

(71) Applicant: Hewlett Packard Enterprise Development LP, Houston, TX (US)

(72) Inventors: Bruce Falzarano, Roseville, CA (US); Wen-Chin Justice, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/917,339

(22) Filed: Jun. 30, 2020

(51) Int. Cl.
*G06F 15/16* (2006.01)
*H04L 12/24* (2006.01)
*H04W 4/80* (2018.01)

(52) U.S. Cl.
CPC .......... *H04L 41/12* (2013.01); *H04L 41/0806* (2013.01); *H04W 4/80* (2018.02)

(58) Field of Classification Search
CPC ....... H04L 41/12; H04L 41/0806; H04W 4/80
See application file for complete search history.

(56) References Cited

U.S. PATENT DOCUMENTS

| | | | |
|---|---|---|---|
| 7,756,027 B1 * | 7/2010 | Reddy | H04L 41/0806 370/230 |
| 9,893,987 B2 * | 2/2018 | Kamble | H04L 41/0806 |
| 10,015,074 B1 | 7/2018 | Chandra et al. | |
| 10,616,339 B2 | 4/2020 | Nagalla et al. | |
| 2016/0173332 A1 * | 6/2016 | Agarwal et al. | H04L 43/08 709/221 |

OTHER PUBLICATIONS

Abramczyk, R., "Bluetooth Custom Services," Mar. 19, 2018, 11 Pgs.
Cisco, "Cisco Catalyst 9000 Switches: A New Era of Networking," Apr. 30, 2019, 256 Pgs.

* cited by examiner

*Primary Examiner* — Normin Abedin
(74) *Attorney, Agent, or Firm* — Hewlett Packard Enterprise Patent Department

(57) ABSTRACT

Examples disclosed herein relate to a method comprising transmitting a first BLUETOOTH communication to a mobile device. The method may include transmitting a second BLUETOOTH communication including a first custom advertisement, a first custom service including a local port for establishing a VSF connection in the network topology including the master network switch, a neighbor port of another switch in the network topology and a MAC address of the another switch and a second custom service including a VSF link interface and a VSF member ID. The method may include receiving a first configuration of the master network switch and creating a second configuration for the network topology using the BLUETOOTH communication from the network switch and the first configuration of the master network switch. The method may also include transmitting the second configuration and establishing a VSF link between the master network switch and the member network switch.

20 Claims, 5 Drawing Sheets

VIRTUAL STACK SETUP

BACKGROUND

Multiple devices on a network, such as a router or switch, may be connected via a communication link, such as ethernet, to form a single virtual device, also known as a stack.

BRIEF DESCRIPTION OF THE DRAWINGS

Some implementations of the present disclosure are described with respect to the following figures.

Figure 1A:
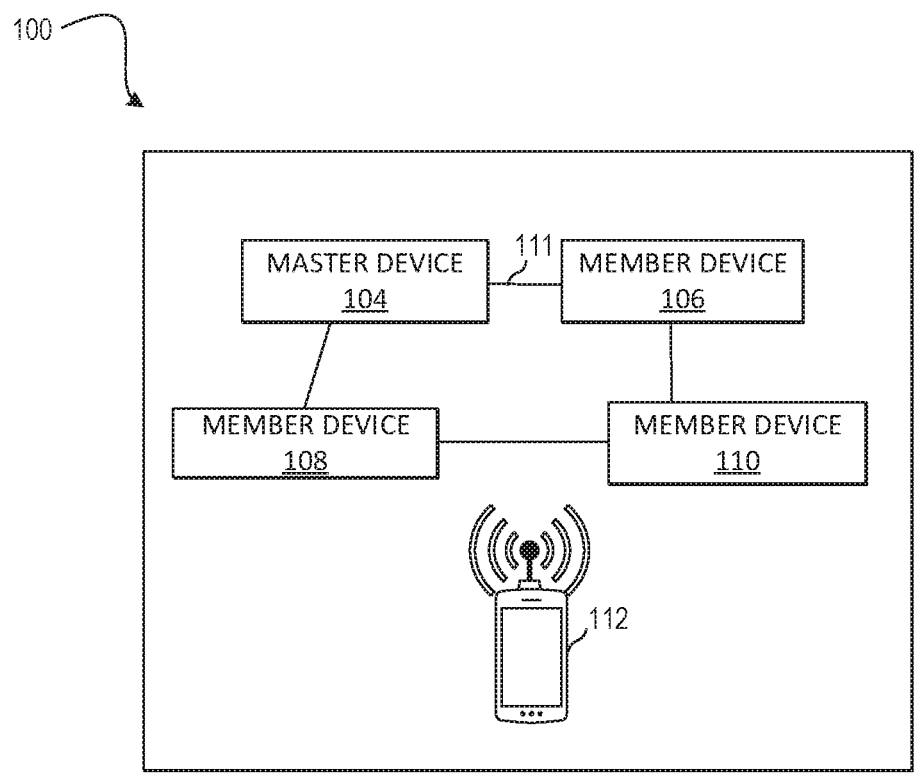
FIG. 1a is a block diagram of an example environment in which virtual stack setup may be useful.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Stacking is a network virtualization technology which virtualizes multiple physical switches in the same layer into one Virtual Switching Framework (VSF) stack. A VSF stack may support a variety of topologies, such as ring and chain topologies. The VSF stack may provide resiliency, scalability and higher bandwidth. VSF allows supported member network devices, such as network switches, to be connected to each other through dedicated point-to-point connections. These connections may include, for example, copper or fiber Ethernet links and may be referred to as VSF links. These links carry encapsulated data plane traffic and may also exchange control plane traffic that helps the VSF stack maintain its topology and state, thereby behaving like a single logical switch.

However, setting up and configuring a stack may be a difficult endeavor. A stack may be created from two or more network devices, such as network switches. Traditionally, a technician may physically set up a network device in, for example, a data center. In this context, setting up means physically placing a network device in a computer equipment rack, inserting a power plug, routing cables, physically connecting the network device to a network (via, for example, a physical ethernet cord), etc. After physically setting up the network device, the network device needs to be added to an existing stack or become part of a new stack. This may require provisioning, configuring, etc. of both the network device and the switch itself. The network technician physically installing the device(s), however, may not have knowledge of configuring a network, knowledge of the specific network being configured, etc. Accordingly, a system and method for virtual stack setup may be useful.

A system and method for virtual stack setup may leverage an application on a mobile device to facilitate configuration of a stack. Specifically, the mobile device may connect to one or more network devices via a wireless communication protocol, such as BLUETOOTH wireless technology standard, to facilitate configuration of the network devices.

A software daemon within an embedded software operating system of a network device may be used to facilitate this communication path. The daemon may use a low energy wireless communication protocol, such as BLUETOOTH low energy (BLE) standard, and one or more custom BLE services to provide configuration information between the mobile app and the network device. Custom services may include a device Identification service, a Link Layer Discovery Protocol (LLDP) service, a VSF stacking service, etc. The daemon may also use a standard service of the wireless communication protocol in a unique way and/or with custom characteristics to enable discovery, enumeration, and configuration of the network device group into a VSF stack.

In at least one embodiment, the subject matter claimed below includes a method. The method may comprise transmitting a first BLUETOOTH communication from a network switch to a non-network switch mobile device and transmitting, from the member network switch, a second BLUETOOTH communication. The second BLUETOOTH communication may include: a first custom advertisement including a model of the member network switch, a company identification of the network switch and a notification indicating whether the network switch is part of a network topology including a master network switch; a first custom service including a local port of the member switch for establishing a VSF connection in the network topology including the master network switch, a neighbor port of another switch in the network topology and a MAC address of the another switch; and a second custom service including at least one VSF link interface for the member switch and a VSF member ID of the member switch. The method may comprise receiving, at the non-network switch mobile device, a first configuration of the master network switch and creating a second configuration for the network topology using the BLUETOOTH communication from the network switch and the first configuration of the master network switch. The method may also comprise transmitting the second configuration to the network switch and the master network switch and establishing a VSF link between the master network switch and the member network switch.

FIG. 1 is a block diagram of an example system for virtual stack setup. A networking system 100, may include a plurality of network devices 104-110. The plurality of network devices 104-110 may be connected via a communication link to form one or more virtual device, also known as a stack. The communication link may be a physical link, such as Ethernet, a wireless link, etc.

The communication link 111 may be a logical interface that connects VSF member devices. The physical interfaces assigned to the communication link may automatically form an aggregate VSF link. The links may also be used to synchronize the control plane traffic that helps the VSF stack maintain its topology and state so as to behave like a single switch. The links may also carry encapsulated data plane traffic.

The network devices may, for example, be network switches with routing capabilities such that the network device is responsible for routing data along a route (or equivalently, path) in the network. The network device may perform, for example, routing of data based on routing information accessible by the router. For example, the routing information can be stored on a storage medium of the network device, or on a storage medium separate from but accessible by the network device.

As described above, virtual Stack Forwarding (VSF) is one technology which enables multiple network devices to be connected via an Ethernet link to form a stack. The devices can be connected in, for example, a chain or a ring topology to form the VSF Stack. The VSF stack can span across multiple geographical locations, such as multiple buildings. Each network device in the VSF stack may be assigned a specific role, such as a commander, a standby or a member role.

The system 100 includes an example VSF stack including network devices designated as a master device 104, a member device 106, a second member device 108 and a third member device 110. Although three member devices are illustrated in FIG. 1A, this is for explanatory purposes and a VSF stack may have more or less member devices. Each of these network devices may have a corresponding local database. The local database may be a centralized database, storing the state and configuration of the network switch as well as state and configuration of other devices of the network or of the network in general. Each device may subscribe to the local database of each other device in the stack, network, etc. to receive changes.

In such an implementation, when the stack is initially formed, one network device in the stack may be selected as a commander node and, in some aspects, another one may be selected as standby node. The other devices in the stack may act as member nodes. The commander node may synchronize the configuration of the stack to the standby node and/or one or more of the other member nodes, so that in the event of failure of the commander node, the standby (or other) node can take over as the commander node with minimal interruption of service.

Each network device may store some or all of the configuration, status, states and statistics of the network, and/or other devices on the network at any given point at time. The different state data may be accessed from the database either individually (data for a given time, a given device, etc.) or in aggregate (data aggregated for particular items over a given time period, etc.).

As described above, configuring a stack in a network may be a difficult task. A user may use an application on a mobile device to facilitate the stack configuration process. The mobile device may be communicatively coupled to one or more network devices that make up (or will make up) the stack via a wireless communication protocol, such as BLUETOOTH low energy. However, the wireless communication protocol may not be appropriate for configuring devices in this way. Accordingly, the wireless communication protocol may be augmented. For example, the BLUETOOTH low energy standard protocol may include one more service and/or advertisements by default. An advertisement may be a data transmissions between devices. A service may be a collection of characteristics and/or relationships to other services used by a device. One example type of service is a GATT service. The GATT service may be made up of numerous characteristics. The characteristics may represent some sort of information used in creating and/or operating a stack. Each characteristic may have a declaration, which is the attribute type, a value of the attribute as well as a descriptor, which may include additional data about the attribute. The system 100 may include customized advertisements and services tailored for creating stacks of network devices. The system 100 may utilize a BLUETOOTH LOW ENERGY DAEMON (BLED), that consists of some combination of standard advertisements, custom advertisements, standard services and custom services. In one aspect, the BLED includes one custom advertisement, one standard service and 3 custom services.

The custom advertisement may include one or more fields, each field having a length and a type. The custom advertisement may include some number of standard fields and some number of custom fields. The custom fields may contain data used in the operation and/or configuration of a stack. Example custom fields may include a Name field, a Company ID field, a PickME field, an IsNew field and a MAC field. The name field may be a string field that includes a model number of a network device. The Company ID may be a strong or number field that includes a unique identofoer of a company associated with the network device. The PickMe field may be number field associated with a button and/or other input method on the network device. When that input is activated, the PickMe field may be updated, so that the PickMe field may indicate that a certain device is to be configured. The IsNew field may be a number field indicating that a device has not been configured before and/or meets a factory default setting. A MAC field may be a numeric field with a unique identifier of a network device, such as a MAC address. Each of these fields may also be associated with one or more additional fields in the advertisement. For example, the Name field may be associated with a LocalName field used for identifying the network device, the Company ID field may be associated with a MfgData field used to identifying the manufacturer of the network device, etc. These fields are for exemplary purposes only and other fiends and/or other combinations of fields could be used.

The custom services may include (1) a LED service for controlling one or more LED lights on the network device, (2) a Link Layer Discovery Protocol (LLDP) service and (3) a stacking service. The LED Service may include a characteristic with one or more data fields indicating a state of one or more LEDs on the network device. The state may be on, off, flashing, error, etc. The LLDP survive may include a characteristic with one or more fields for LLDP information on a linked port of the network device. This information may include a port identifier of a port on the network device to be used for stacking, a identifying address (such as a MAC address) of a second device connected to the network device that belongs to or is going to belong to the same stack as the network device as well as a port identifier of a port on the second device to be used for stacking.

The stacking service may include a characteristic with one or more data fields for identifying stacking information. This information may include one or more interfaces on the network device or neighboring devices used for stacking, a member ID of the network device or neighboring devices used for stacking as well as a reboot flag. The reboot flag will be discussed in further detail below.

Figure 1B:
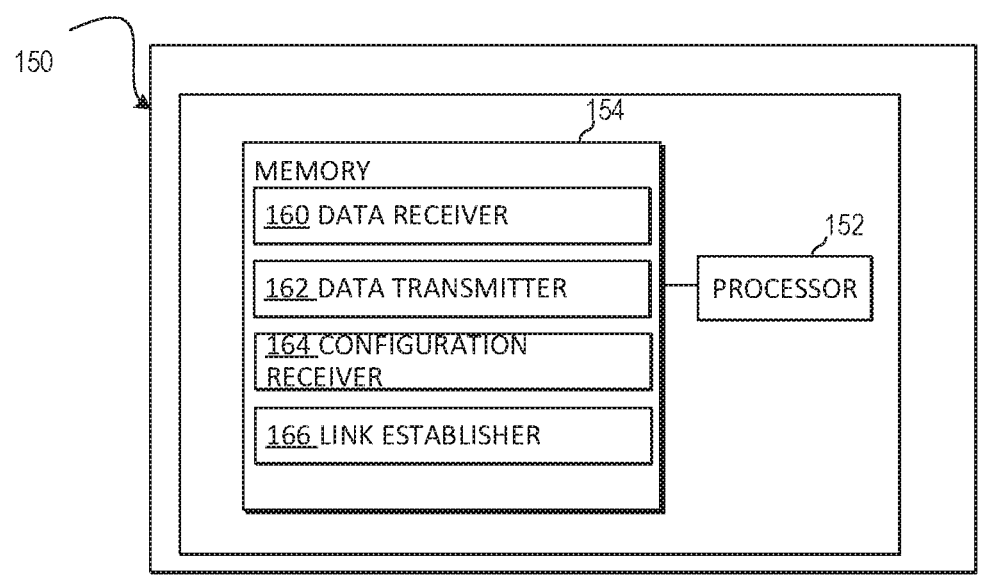
FIG. 1b is a flow diagram of an example system for virtual stack setup.

Turning now to FIG. 1B, a block diagram of an example system 150 for virtual stack setup. System 150 may include a processor 152 and a memory 154 that may be coupled to each other through a communication link (e.g., a bus).

Processor 152 may include a single or multiple Central Processing Units (CPU) or another suitable hardware processor(s). In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for data receiver 160, data transmitter 162, configuration receiver 164, link establisher 166 and/or other components. According to various implementations, system 150 may be implemented in hardware and/or a combination of hardware and programming that configures hardware. Furthermore, in FIG. 1 and other Figures described herein, different numbers of components or entities than depicted may be used.

Processor 152 may execute data receiver 160 to receive, at a network switch, a first BLUETOOTH communication from a non-network switch mobile device.

Processor 152 may execute data transmitter 162 to transmit, from the member network switch, a second BLUETOOTH communication including a first custom advertisement, a first custom service and a second custom service. A first custom advertisement may include a model of the member network switch, a company identification of the member network switch and a notification indicating whether the network switch is part of a network topology including a master network switch. A first custom service may include a local port of the member switch for establishing a VSF connection in the network topology including the master network switch, a neighbor port of another switch in the network topology and a MAC address of the another switch.

The first custom service may be a LLDP service. A second custom service may include at least one VSF link interface for the member switch and a VSF member ID of the member switch. Processor 152 may execute configuration receiver 164 to receive a second configuration from the non-network switch mobile device, the second configuration created using the BLUETOOTH communication from the network switch and a first configuration of a master network switch received at the non-network switch mobile device.

The non-network switch mobile device may be a mobile phone and the second configuration may be created using a dedicated network configuration application executed on the mobile phone. The first configuration of the master switch may be received from a cloud based network management service and the second configuration is generated via the cloud based network management service.

In some aspects, the system may also include instructions for a configuration verifier that may be executed by processor 152 to establish, via BLUETOOTH, communication with a member network switch belonging to the network topology, receive, from the member network switch, a third configuration and verify configuration information from the third configuration corresponding to the member network switch to configuration information from the first configuration corresponding to the member network switch. In these aspects, the second configuration may be created using information from the third configuration.

Processor 152 may execute link establisher 166 to establish a VSF link between the master network switch and the member network switch. The link establisher may also transmit, via the VSF link, information between the master network switch and the network switch without communicating to the non-network switch mobile device. Transmitting information between the master network switch and the network switch without communicating to the non-network switch mobile device may be done over a non-BLUETOOTH communication protocol.

Figure 2:
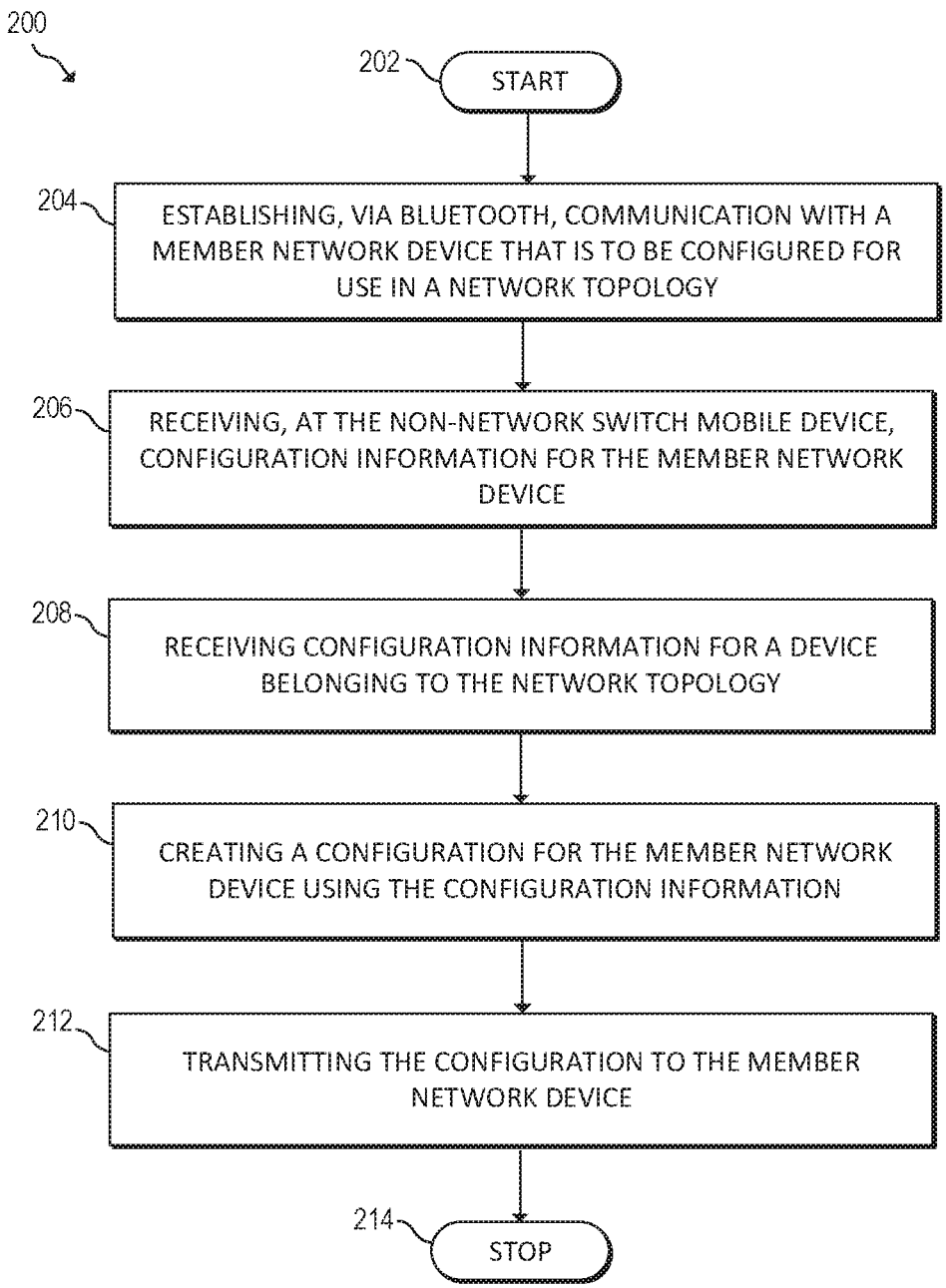
FIG. 2 is a flow diagram of an example method for virtual stack setup.

FIG. 2 is a flow diagram of a method 200 for virtual stack setup. The system where method 200 is performed may be similar to system 100 described above. Accordingly, parts of and/or the entire method may be performed by one or more of the devices belonging to system 100. For example, method 200 may be performed by mobile device 112.

The method 200 may begin at block 202 and proceed to block 204, where the method may include establishing, via BLUETOOTH, communication with a member network device that is to be configured for use in a network topology. In some aspects, the member network device will be configured to be added to a network stack. In some aspects, the member network device may be part of a network stack and the configuration will change some aspect of the member stack, such as adding a network device, removing a network device, etc.

A user, such as a technician may physically install the member network device in, for example, a data center. One the member network device is physically installed, the user may use a mobile application on a non-network switch mobile device, such as a mobile phone, to facilitate the setup of the network device as part of the network stack. The mobile application may use the BLUETOOTH capabilities of the mobile device to establish a connection with the network device.

Once the BLUETOOTH connection is established, the mobile device may receive information from the network device. At block 206, the method may include receiving, at the application running on the non-network switch mobile device, configuration information for the member network device via the established BLUETOOTH connection.

At block 208, the method may include receiving configuration for one or more devices belonging to the network topology. The configuration may be received using some or all of the BLUETOOTH profile information discussed above in reference to FIGS. 1A-1B. The mobile application may also collect information from other devices in the network that belong to the stack or will belong to the stack (i.e. not the member device that is to be configured for use). This may be done in a variety of ways. In some aspects, the mobile application may establish BLUETOOTH connections with one or more other network devices belonging to the stack. In some aspects, the mobile application may connect to a configuration device with configuration on the network topology and/or one more members of the stack. The configuration device may be local to the member network device, such as being located in a geographically location that is physically close to the member network device. The configuration device may also be part of a cloud service offering and may not be located in a geographically location that is physically close to the member network device.

At block 210, the method may include creating a configuration for the member network device using the configuration information. In some aspects, the configuration may be created on the mobile application on the mobile device. The configuration may be synchronized with one or more configurations on the configuration device. In some aspects, the configuration may be created by the configuration device and then transmitted to the mobile application for distribution. At block 212, the method may include transmitting the configuration from the mobile application and/or configuration device to the member network device.

In some aspects, the configuration may also be transmitted to each member of the stack. The method may proceed to block 214, where the method may end.

Figure 3:
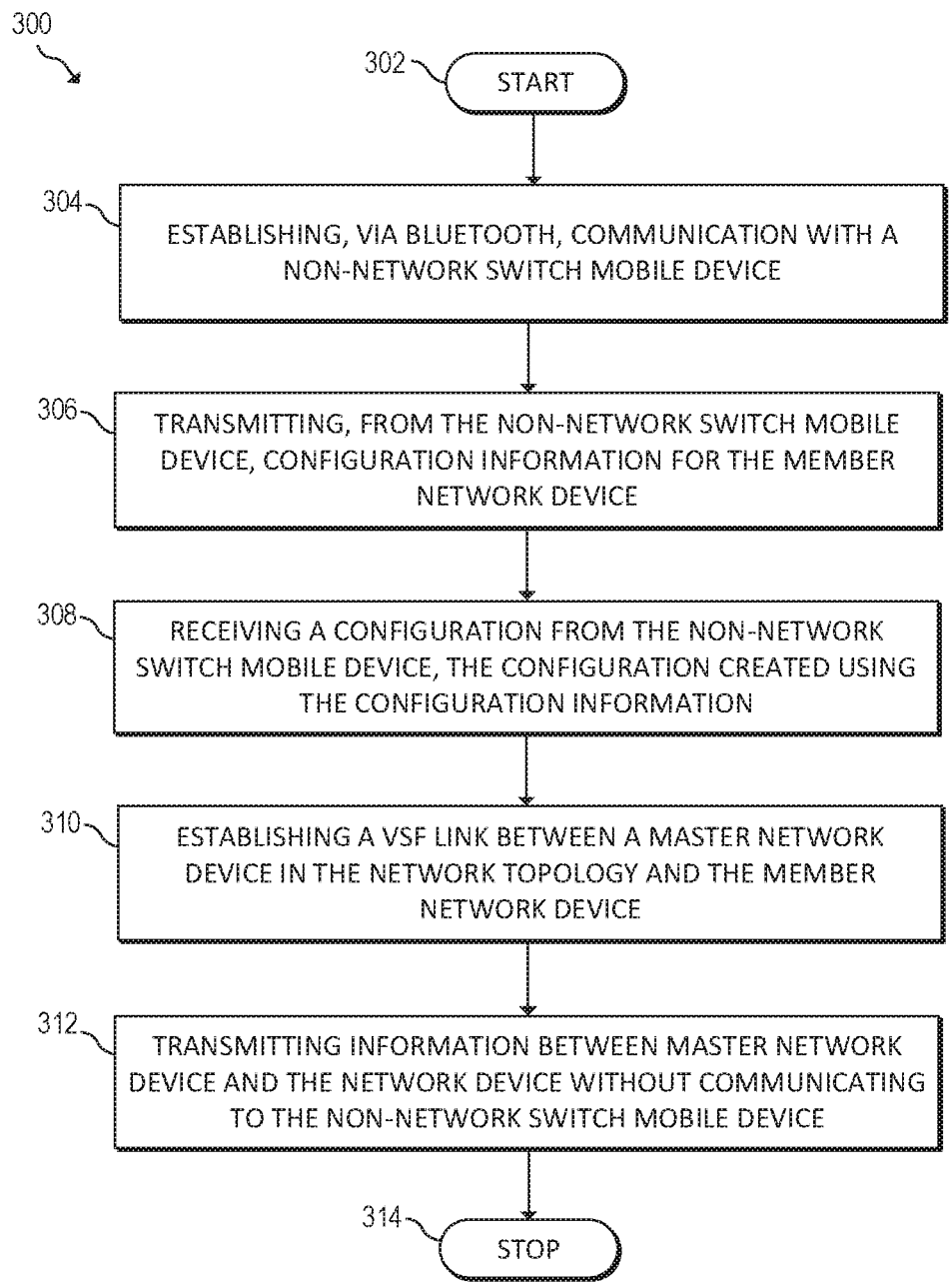
FIG. 3 is a flow diagram of another example method for virtual stack setup

FIG. 3 is a flow diagram of a method 300 for virtual stack setup. The system where method 300 is performed may be similar to system 100 described above. Accordingly, parts of and/or the entire method may be performed by one or more of the devices belonging to system 100. For example, method 300 may be performed by one or more of the devices 104-110.

The method 300 may begin at block 302 and proceed to block 304, where the method may include establishing, via BLUETOOTH, communication with a non-network switch mobile device. The method may proceed to block 306, where the method may include transmitting, from the non-network switch mobile device, configuration information for the member network device. The configuration may be received using some or all of the BLUETOOTH profile information discussed above in reference to FIGS. 1A-1B. At block 308, the method may include receiving a configuration from the non-network switch mobile device. The configuration may be created using the configuration information, using some or all of the steps discussed above in reference to FIG. 2.

At block 310, the method may include establishing a VSF link between a master network device in the network topology and the member network device and at block 312, the method may include transmitting information between master network device and the network device without communicating to the non-network switch mobile device. The method may proceed to block 314, where the method may end.

Figure 4:
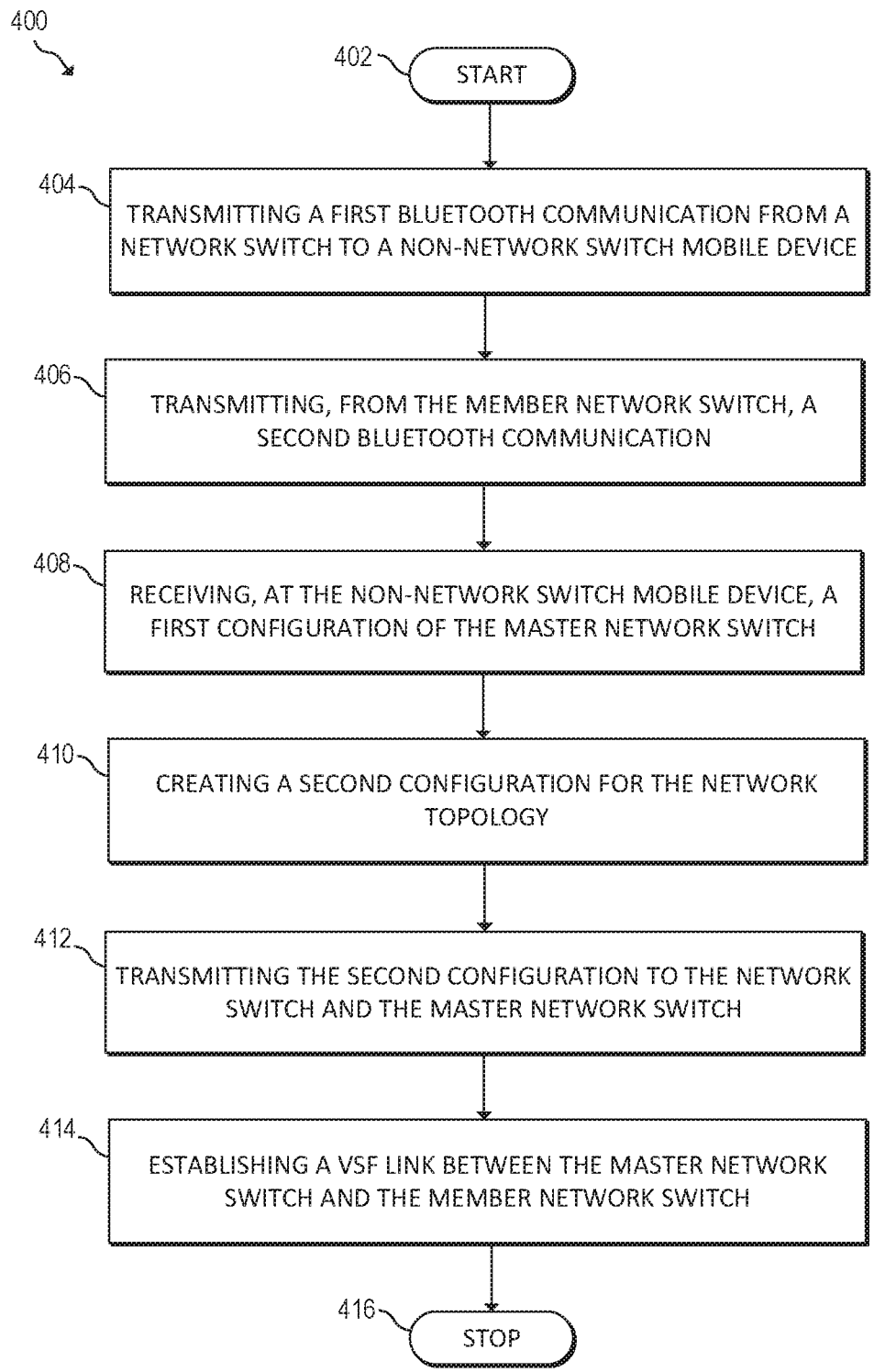
FIG. 4 is a flow diagram of another example method for virtual stack setup

FIG. 4 is a flowchart of an example method 400 for virtual stack setup. The system where method 400 is performed may be similar to system 100 described above. Accordingly, parts of and/or the entire method may be performed by one or more of the devices belonging to system 100. Method 400 may start at block 402 and continue to block 404, where the method 400 may include transmitting a first BLUETOOTH communication from a network switch to a non-network switch mobile device. The method may proceed to block 406, where the method may include transmitting, from the member network switch, a second BLUETOOTH communication including: (1) a first custom advertisement including a model of the member network switch, a company identification of the network switch and a notification indicating whether the network switch is part of a network topology including a master network switch. The first custom service may be a LLDP service; (2) a first custom service including a local port of the member switch for establishing a VSF connection in the network topology including the master network switch, a neighbor port of another switch in the network topology and a MAC address of the another switch; and (3) a second custom service including at least one VSF link interface for the member switch and a VSF member ID of the member switch.

At block 408, the method may include receiving, at the non-network switch mobile device, a first configuration of the master network switch and at block 410, the method may include creating a second configuration for the network topology using the BLUETOOTH communication from the network switch and the first configuration of the master network switch.

The non-network switch mobile device may be a mobile phone and the second configuration may be created using a dedicated network configuration application executed on the mobile phone. The first configuration of the master switch may be received from a cloud based network management service and the second configuration is generated via the cloud based network management service.

At block 412, the method may include transmitting the second configuration to the network switch and the master network switch and at block 414, the method may include establishing a VSF link between the master network switch and the member network switch.

In some aspects, the method 400 may include establishing, via BLUETOOTH, communication with a member network switch belonging to the network topology, receiving, from the member network switch, a third configuration and verifying configuration information from the third configuration corresponding to the member network switch to configuration information from the first configuration corresponding to the member network switch. In these aspects, the second configuration may be created using information from the third configuration.

In some aspects, the method may also include transmitting, via the VSF link, information between the master network switch and the network switch without communicating to the non-network switch mobile device. Transmitting information between the master network switch and the network switch without communicating to the non-network switch mobile device may be done over a non-BLUETOOTH communication protocol. The method may proceed to block 416, where the method may end.

Figure 5:
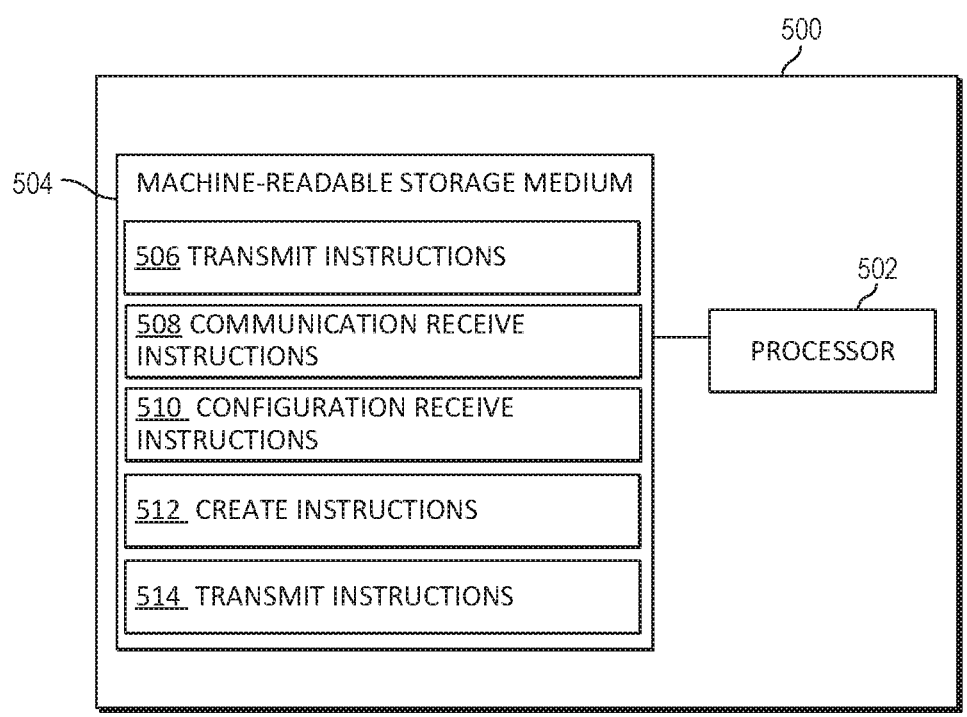
FIG. 5 is a block diagram of an example storage medium storing machine-readable instructions for virtual stack setup.

FIG. 5 is a block diagram of an example system 500 for virtual stack setup. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510, 512 and 514 for virtual stack setup. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, transmit instructions 506, when executed by a processor (e.g., 502), may cause system 500 to transmit a first BLUETOOTH communication from a non-network switch mobile device to a network switch.

Communication receive instructions 508, when executed by a processor (e.g., 502), may cause system 500 to receive, from the member network switch, a second BLUETOOTH communication including: (1) a first custom advertisement including a model of the member network switch, a company identification of the member network switch and a notification indicating whether the network switch is part of a network topology including a master network switch, (2) a first custom service including a local port of the member switch for establishing a VSF connection in the network topology including the master network switch, a neighbor port of another switch in the network topology and a MAC address of the another switch, and (3) a second custom service including at least one VSF link interface for the member switch and a VSF member ID of the member switch.

Configuration receive instructions 506, when executed by a processor (e.g., 502), may cause system 500 to receive, at the non-network switch mobile device, a first configuration of the master network switch.

Create instructions 506, when executed by a processor (e.g., 502), may cause system 500 to create a second configuration for the network topology using the BLUETOOTH communication from the network switch and the first configuration of the master network switch. The non-network switch mobile device may be a mobile phone and the second configuration may be created using a dedicated network configuration application executed on the mobile phone. The first configuration of the master switch may be received from a cloud based network management service and the second configuration may be generated via the cloud based network management service.

In some aspects, the processor (e.g., 502) may execute instructions to cause system 500 to establish, via BLUETOOTH, communication with a member network switch belonging to the network topology, receive, from the member network switch, a third configuration and verify configuration information from the third configuration corresponding to the member network switch to configuration information from the first configuration corresponding to the member network switch. In these aspects, the second configuration may be created using information from the third configuration Transmit instructions 506, when executed by a processor (e.g., 502), may cause system 500 to transmit the second configuration to the network switch and the master network switch for establishing a VSF link between the master network switch and the member network switch.

In some aspects, the processor (e.g., 502) may execute instructions to cause system 500 to transmit, via the VSF link, information between the master network switch and the network switch without communicating to the non-network switch mobile device. Transmitting information between the master network switch and the network switch without communicating to the non-network switch mobile device may be done over a non-BLUETOOTH communication protocol.

The foregoing disclosure describes a number of examples for virtual stack setup. The disclosed examples may include systems, devices, computer-readable storage media, and methods for virtual stack setup. For purposes of explanation, certain examples are described with reference to the components illustrated in FIGS. 1A-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
    transmitting a first BLUETOOTH communication from a network switch to a non-network switch mobile device;
    transmitting, from the member network switch, a second BLUETOOTH communication including:
        a first custom advertisement including a model of the member network switch, a company identification of the network switch and a notification indicating whether the network switch is part of a network topology including a master network switch,
        a first custom service including a local port of the member switch for establishing a VSF connection in the network topology including the master network switch, a neighbor port of another switch in the network topology and a MAC address of the another switch,
        a second custom service including at least one VSF link interface for the member switch and a VSF member ID of the member switch;
    receiving, at the non-network switch mobile device, a first configuration of the master network switch;
    creating a second configuration for the network topology using the BLUETOOTH communication from the network switch and the first configuration of the master network switch;
    transmitting the second configuration to the network switch and the master network switch; and
    establishing a VSF link between the master network switch and the member network switch.

2. The method of claim 1 comprising:
    transmitting, via the VSF link, information between the master network switch and the network switch without communicating to the non-network switch mobile device.

3. The method of claim 2 wherein transmitting information between the master network switch and the network switch without communicating to the non-network switch mobile device is done over a non-BLUETOOTH communication protocol.

4. The method of claim 1 wherein the first custom service is a LLDP service.

5. The method of claim 1 wherein the non-network switch mobile device is a mobile phone and the second configuration is created using a dedicated network configuration application executed on the mobile phone.

6. The method of claim 1 wherein the first configuration of the master switch is received from a cloud based network management service and the second configuration is generated via the cloud based network management service.

7. The method of claim 1 comprising:
establishing, via BLUETOOTH, communication with a member network switch belonging to the network topology;
receiving, from the member network switch, a third configuration; and
verifying configuration information from the third configuration corresponding to the member network switch to configuration information from the first configuration corresponding to the member network switch.

8. A system comprising:
a data receiver to receive, at a network switch, a first BLUETOOTH communication from a non-network switch mobile device;
a data transmitter to transmit, from the member network switch, a second BLUETOOTH communication including:
a first custom advertisement including a model of the member network switch, a company identification of the member network switch and a notification indicating whether the network switch is part of a network topology including a master network switch,
a first custom service including a local port of the member switch for establishing a VSF connection in the network topology including the master network switch, a neighbor port of another switch in the network topology and a MAC address of the another switch, and
a second custom service including at least one VSF link interface for the member switch and a VSF member ID of the member switch;
a configuration receiver to receive a second configuration from the non-network switch mobile device, the second configuration created using the BLUETOOTH communication from the network switch and a first configuration of a master network switch received at the non-network switch mobile device; and
a link establisher to establish a VSF link between the master network switch and the member network switch.

9. The system of claim 8 comprising:
the link establisher to transmit, via the VSF link, information between the master network switch and the network switch without communicating to the non-network switch mobile device.

10. The system of claim 9 wherein transmitting information between the master network switch and the network switch without communicating to the non-network switch mobile device is done over a non-BLUETOOTH communication protocol.

11. The system of claim 8 wherein the first custom service is a LLDP service.

12. The system of claim 8 wherein the non-network switch mobile device is a mobile phone and the second configuration is created using a dedicated network configuration application executed on the mobile phone.

13. The system of claim 8 wherein the first configuration of the master switch is received from a cloud based network management service and the second configuration is generated via the cloud based network management service.

14. The system of claim 8 comprising:
A configuration verifier to:
establish, via BLUETOOTH, communication with a member network switch belonging to the network topology;
receive, from the member network switch, a third configuration; and
verify configuration information from the third configuration corresponding to the member network switch to configuration information from the first configuration corresponding to the member network switch.

15. A non-transitory machine-readable storage medium encoded with instructions, the instructions executable by a processor of a system to cause the system to:
transmit a first BLUETOOTH communication from a non-network switch mobile device to a network switch;
receive, from the member network switch, a second BLUETOOTH communication including:
a first custom advertisement including a model of the member network switch, a company identification of the member network switch and a notification indicating whether the network switch is part of a network topology including a master network switch,
a first custom service including a local port of the member switch for establishing a VSF connection in the network topology including the master network switch, a neighbor port of another switch in the network topology and a MAC address of the another switch, and
a second custom service including at least one VSF link interface for the member switch and a VSF member ID of the member switch;
receive, at the non-network switch mobile device, a first configuration of the master network switch;
create a second configuration for the network topology using the BLUETOOTH communication from the network switch and the first configuration of the master network switch; and
transmit the second configuration to the network switch and the master network switch for establishing a VSF link between the master network switch and the member network switch.

16. The non-transitory machine-readable storage medium of claim 15, wherein the second configuration allows for a transmission of information between the master network switch and the network switch, via the VSF link, without communicating to the non-network switch mobile device.

17. The non-transitory machine-readable storage medium of claim 16, wherein transmitting information between the master network switch and the network switch without communicating to the non-network switch mobile device is done over a non-BLUETOOTH communication protocol.

18. The non-transitory machine-readable storage medium of claim 15 wherein the non-network switch mobile device is a mobile phone and the second configuration is created using a dedicated network configuration application executed on the mobile phone.

19. The non-transitory machine-readable storage medium of claim 15 wherein the first configuration of the master switch is received from a cloud based network management service and the second configuration is generated via the cloud based network management service.

20. The non-transitory machine-readable storage medium of claim 15, the instructions executable by a processor of a system to cause the system to:

establish, via BLUETOOTH, communication with a member network switch belonging to the network topology;

receive, from the member network switch, a third configuration; and verify configuration information from the third configuration corresponding to the member network switch to configuration information from the first configuration corresponding to the member network switch.

\* \* \* \* \*